Feb. 25, 1936.  B. F. CRICK  2,032,005

BELT FASTENER

Filed Nov. 7, 1934

Inventor

B. F. Crick

By Clarence A. O'Brien
Attorney

Patented Feb. 25, 1936

2,032,005

UNITED STATES PATENT OFFICE 2,032,005

BELT FASTENER

Burton F. Crick, Peers, Alberta, Canada

Application November 7, 1934, Serial No. 751,938

1 Claim. (Cl. 24—36)

This invention relates to a belt fastener or lacing, the general object of the invention being to provide means whereby the ends of a belt can be easily and quickly connected together without using the hinge arrangement now in use.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
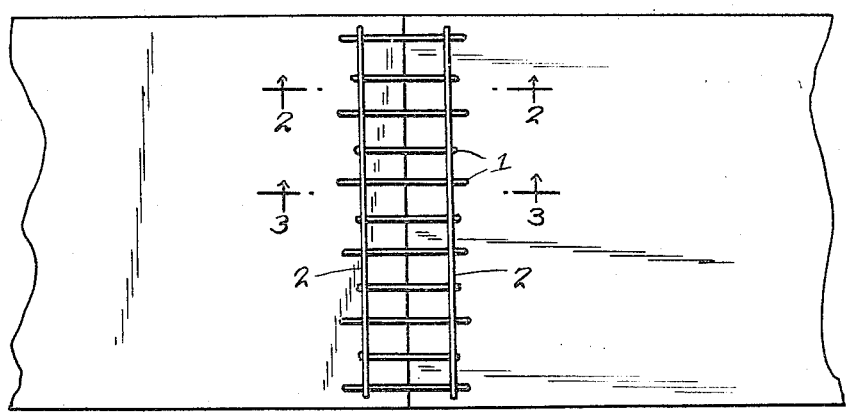
Fig. 1 is a top plan view showing the end portions of a belt connected together by the invention.
Figure 2:
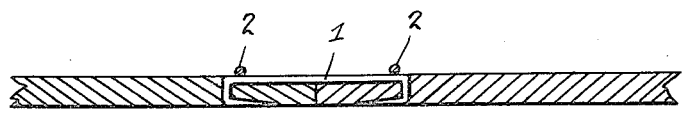
Fig. 2 is a section on line 2—2 of Fig. 1.
Figure 3:
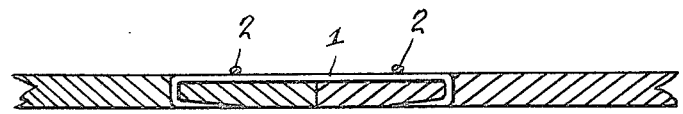
Fig. 3 is a section on line 3—3 of Fig. 1.
Figure 4:
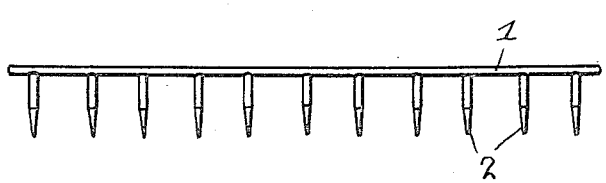
Fig. 4 is an edge view of the device.

As shown in this drawing, the device comprises a plurality of staples 1 which are connected together by a pair of bars 2 which are welded or otherwise connected to the top portions of the bights of the staples so as to hold the staples in spaced relation as clearly shown in Figs. 1 and 4. Alternate staples may be made of less width than the other staples as shown in Fig. 1, so that the pointed limbs of the staples will be staggered where they enter the belt or if desired, all the staples may be made of the same width but held together in staggered relation by the bars. As will be understood, the device is placed on the ends of the belt with the pointed ends of the staples engaging the belt and then the device is driven into the belt so that the bights of the staples will enter the leather or other material from which the belt is made so that these bight portions will be flush with the inner surface of the belt. The ends of the staples are upset and driven into the belt as shown in Figs. 2 and 3 and the device can be made flexible enough so that it will pass around a pulley.

It is thought from the foregoing description that the advantages and novel features of the invention will be readily apparent.

It is to be understood that changes may be made in the construction and in the combination and arrangement of the several parts, provided that such changes fall within the scope of the appended claim.

I claim:

A belt fastener comprising a plurality of staples spaced apart, each staple comprising an elongated bight and a pair of limbs, a pair of elongated bars extending at right angles to the bights and contacting the said bight parts adjacent the ends thereof, said bars being welded to the bight parts of the staples.

BURTON F. CRICK.